Patented Apr. 3, 1934

1,953,332

UNITED STATES PATENT OFFICE 1,953,332

BREAD IMPROVER AND METHOD OF MAKING THE SAME

Franklin B. Baker, Chicago, Ill.

No Drawing. Application February 10, 1930, Serial No. 427,434

3 Claims. (Cl. 99—10)

This invention pertains to a new composition of matter used as a bread improver and to the method of making and using the same.

Among the objects of this invention are to provide a bread improver which will shorten the fermenting period of a dough batch and provide a finished loaf of greater cubical content than would be obtained without the use of this improver and yet having a very desirable texture. A further object of this invention is to aid in thoroughly and uniformly distributing through the dough batch the ingredients which bring about these results.

This new bread improver is made and used in the following manner: A quantity of starch is first converted into dextrine by means of heat and acid, the acid preferably being hydrochloric. A quantity of lactic acid is also added to the starch either at the time of adding the hydrochloric acid or upon the completion of the conversion. With the starch converted to the desired extent and the lactic acid present therein, ammonia gas is thereupon added until the acid condition of the dextrine is substantially neutralized, leaving the dextrine in either a slightly acid, neutral or slightly alkaline condition, as may be desired. If the moisture content of the product then requires it, the substance may then be dried in any suitable manner as by the application of heat. The dextrine is then in a white, dry, powdery, non-hygroscopic state and may be added to a dough batch in any desired amount, such for example as five pounds to 196 pounds of flour. During the fermenting of the dough batch the dextrose and maltose and some of the other starch derivatives in the dextrine are gradually converted into alcohol and carbon dioxide. Also during the fermenting the ammonia gradually becomes available as a food and stimulant for the yeast, thus stimulating the yeast to greater activity to thereby shorten the fermenting period and to give as a final result a loaf of greater size. Though the size of the loaf is increased it is found that the texture is uniformly porous and of good color.

The manner of making the dextrine may be varied in accordance with the preference of the maker. Several of the factors in its manufacture are variable, such for example as the temperatures employed, duration of heating, amount of acid and moisture. Also instead of hydrochloric acid some other acid may be used which likewise has the ability to convert the starch. Also instead of making the dextrine by the acid conversion process it may be made by the malt diastase process which is equally well known. Instead of the lactic acid some other weak organic acid may be used, such as acetic or citric acid.

It is desired to incorporate in a finished product a large amount of ammonia stored therein in whatever form it will remain, but where a small amount of hydrochloric acid is used to limit the conversion of the starch there is not enough free hydrochloric acid present at the end of the conversion to unite with any large amount of ammonia. Consequently, I add the weak organic acid which will have very little converting effect on the starch but will be capable of combining a large amount of ammonia. Thus I am enabled to incorporate in the dry bread improver a large amount of ammonia or the salts thereof without employing any more than the minimum amount of hydrochloric acid.

One example of the method of making the dextrine is as follows: 1¼ pounds of a 28% solution of hydrochloric acid is sprayed into 1,000 pounds of dry starch. The amount of hydrochloric acid may be varied. The lactic acid is preferably mixed with the hydrochloric acid and added simultaneously. The amount of lactic acid which is employed may also be varied. I have used 12,250 cubic centimeters of a 50% solution of lactic acid for a thousand pounds of starch with good results. I have found that acetic acid or citric acid may be used in about the same amounts as lactic acid. After the acids have been added and thoroughly mixed with the starch, the starch is then heated in a steam jacketed converter for 35 to 45 minutes with its temperature gradually rising up to a maximum temperature of 240° F. By this time the conversion of the starch will have been carried sufficiently far for the purpose of this invention and there will be present in the finished dextrine between three and, perhaps, fifteen per cent of dextrose together with other partially converted starch derivatives such as dextrin. The steam should then be shut off and while the dextrine is still hot it is preferable to add the ammonia gas while agitating the dextrine to thoroughly diffuse the ammonia throughout the dextrine. Ammonia will be added until the acid condition of the dextrine is substantially neutralized. The dextrine is at that time a white dry non-hygroscopic powder which may be stored for long periods of time, without deterioration, without discoloration or without absorbing moisture and becoming lumpy.

It is found that by using this product the amount of yeast which would otherwise have been employed in the absence of this product may be materially diminished when this product is employed. This is a considerable saving in itself. Also the amount of sugar normally required for a dough batch is partially supplied by the sugars in the dextrine, hence the sugar supplied in other manners may be diminished. Due to the stimulating action of the ammonia which is released during the fermenting period the activity of the yeast is greatly increased and the fermenting period may be greatly shortened. In commercial operations where the time factor is very important this reduction of the fermenting period is highly desirable.

As has been stated above the proportions of the ingredients employed in the composition of the bread improver are subject to variation in accordance with the judgment or taste of the baker. These and other modifications are contemplated in this invention and are included within its scope.

The lactic acid which is incorporated in this composition and which is presumably freed during the fermenting period of the dough batch is itself a helpful factor in aiding the dough to ripen quicker, in assuring a more vigorous yeast fermentation and in preventing certain undesirable fermentation conditions such as give rise to ropy or stringy bread. The bread produced by this composition is invariably free from a ropy or stringy condition and is found to have a creamy crumb, a uniform grain and a uniform porous structure.

The exact manner in which the ammonia is combined in the dextrine is not known. Various laboratory tests have been conducted to determine if the ammonia is present as ammonium lactate but from these tests I have not discovered that ammonium lactate was formed. What I do know is that the ammonia once incorporated in the dextrine in the manner described will remain there even though the product be stored for a long period of time and exposed to the atmosphere, hence the ammonia is available at any time for use in the dough batch as a yeast stimulant. The neutralization or approximate neutralization of the dextrine by means of the ammonia assures that the conversion of the dextrine will have been stopped, hence the character of the dextrine will not change during storage.

The combination of the sugars and modified starches in the dextrine, the lactic acid and the ammonia is found to be perfectly stable and tests reveal that the several ingredients thereof are uniformly distributed throughout the bread improver. Since this bread improver is a dry finely divided powder it is a simple matter to thoroughly mix it with the flour to be used in the dough batch and to thus obtain even distribution of the bread improver throughout the entire dough batch.

It should be understood that this invention is susceptible of embodiment in various modifications which will employ the principles of this invention and will still remain within the scope of the invention.

Having shown and described my invention, I claim:

1. A method of making a bread improver comprising forming a partially converted dextrinous starch derivative with the aid of a small quantity of a strong starch converting acid in the presence of a larger quantity of a non-starch converting weak organic acid without liquefying the product; adding ammonia thereto until the entire product is substantially neutralized and drying the product.

2. A method of making a bread improver comprising admixing with dry starch a small quantity of hydrochloric acid and a larger quantity of a weak organic acid, heating the mixture until approximately fifteen percent thereof has been converted to dextrose without liquefying the product at any stage, thereafter neutralizing the converted mixture by means of ammonia gas, and finally drying the product and forming a white, dry non-hygroscopic powder.

3. A method of making a bread improver comprising thoroughly admixing starch, a solution containing a small quantity of hydrochloric acid and a considerably larger quantity of a weak organic acid, the latter acid being incapable of having any substantial converting effect upon the starch, converting the product so formed short of liquefying it and to use up substantially all of the hydrochloric acid, thereafter neutralizing the starch conversion product with ammonia gas, and drying the product forming a dry non-hygroscopic powder.

FRANKLIN B. BAKER.